US006793427B1

(12) United States Patent
Sterling

(10) Patent No.: US 6,793,427 B1
(45) Date of Patent: Sep. 21, 2004

(54) WRITING AID FOR CHILDREN, HANDICAP OR ELDERLY INDIVIDUALS AND METHOD THEREFOR

(76) Inventor: Remko C. Sterling, 4719 Rock Wren Ct., Prescott, AZ (US) 86301

(*) Notice: Subject to any disclaimer, the term of this patent is extended or adjusted under 35 U.S.C. 154(b) by 0 days.

(21) Appl. No.: 10/684,636

(22) Filed: Oct. 14, 2003

(51) Int. Cl.$^7$ .......................... A46B 11/00; B43K 29/00; G09B 21/00

(52) U.S. Cl. ........................... 401/48; 401/195; 401/99; 434/112

(58) Field of Search ........................... 401/99, 195, 48, 401/131, 52; 434/112, 117

(56) References Cited

U.S. PATENT DOCUMENTS 2,503,061 A 4/1950 Moholy-Nagy
3,238,643 A 3/1966 O'Connor
3,373,509 A 3/1968 Brass
3,872,611 A * 3/1975 Kuhn .......................... 434/117
3,972,628 A 8/1976 Stevers

* cited by examiner

*Primary Examiner*—David J. Walczak
(74) *Attorney, Agent, or Firm*—Jeffrey D. Moy; Harry M. Weiss; Weiss, Moy & Harris, P.C.

(57) ABSTRACT

A writing aid for helping to steady a hand of an individual to allow the individual to write in a more steady manner has a writing pad. The writing pad has a magnetic layer. A writing instrument is provided wherein the writing instrument has at least one magnet coupled to a bottom section of the writing instrument. The magnetic attraction between the magnet and the magnetic layer will steady the hand of the individual using the writing aid. The writing instrument is adjustable so that the individual can adjust a distance a writing tip of the writing instrument is deployed. By adjusting the length of the writing tip that is deployed, the individual can adjust the magnetic attraction between the magnet at the bottom section of the writing instrument and the magnetic layer.

11 Claims, 1 Drawing Sheet

WRITING AID FOR CHILDREN, HANDICAP OR ELDERLY INDIVIDUALS AND METHOD THEREFOR

BACKGROUND OF THE INVENTION

1. Field of the Invention:

This invention relates generally to a writing aid and, more specifically, to a writing aid that will help to steady the hand of young children, handicapped individuals, or the elderly in order to allow them to write in a more steady manner.

2. Description of the Prior Art:

For many people, like young children, handicapped individuals, or the elderly, it is difficult to hold a writing instrument. This is also true for many people who suffer from arthritis, poliomyelitis, or other ailments. These people have a difficult time holding the writing instrument in an upright manner so that the tip of the writing instrument proper touches the paper on which the person is writing. The above people may also suffer from another problem. When writing, the hands of the above people have a tendency to shake. Thus, the writings of the above people may be fairly messy and not legible.

U.S. Pat. No. 3,972,628 discloses a writing instrument support. The '628 Patent is designed do allow one to better hold the writing instrument. However, this device does nothing to help solve the problems associated with those who's hands are not steady and have a tendency to shake. Thus, the '628 Patent will not help one to improve the legibility of one's writings.

U.S. Pat. No. 3,373,509 discloses a handicapped children's writing aid. The writing aid uses a magnet and a metal plate in order to steady the hand of the writer. While this device does work, there is a problem with the design. The main problem is that the strength of the magnet is not adjustable. The magnetic attraction between the magnet and the board may be so strong that some people will have a difficult time moving the writing device. Since different people will have different levels of ability to write, the level of magnetic pull between the magnet and the metal board needs to be adjustable.

Therefore, a need existed to provide an improved writing aid. The improved writing aid must overcome the problems associated with the prior art.

SUMMARY OF THE INVENTION

In accordance with one embodiment of the present invention, it is an object of the present invention to provide an improved writing aid.

It is another object of the present invention to provide an improved writing aid that overcomes the problems associated with the prior art.

BRIEF DESCRIPTION OF THE EMBODIMENTS

In accordance with one embodiment of the present invention, a writing aid for helping to steady a hand of an individual to allow the individual to write in a more steady manner is disclosed. The writing aid has a writing pad. The writing pad has a magnetic layer. A writing instrument is provided wherein the writing instrument has at least one magnet coupled to a bottom section of the writing instrument. The magnetic attraction between the magnet and the magnetic layer will steady the hand of the individual using the writing aid. The writing instrument is adjustable so that the individual can adjust a distance a writing tip of the writing instrument is deployed. By adjusting the length of the writing tip that is deployed, the individual can adjust the magnetic attraction between the magnet at the bottom section of the writing instrument and the magnetic layer.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
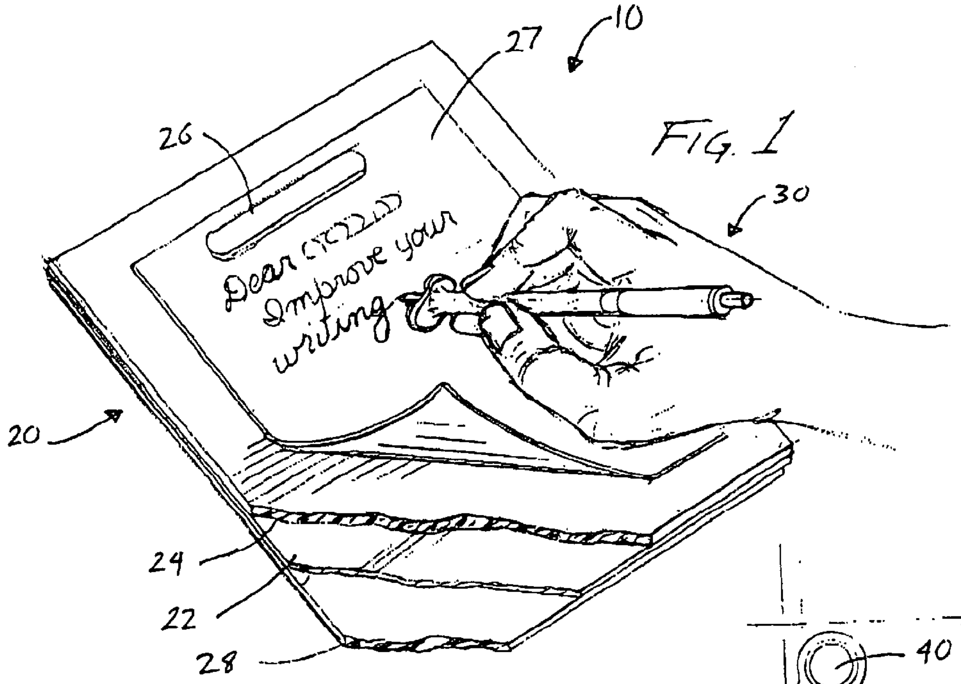
FIG. 1 is an elevated perspective view of the writing aid of the present invention.
Figure 5:
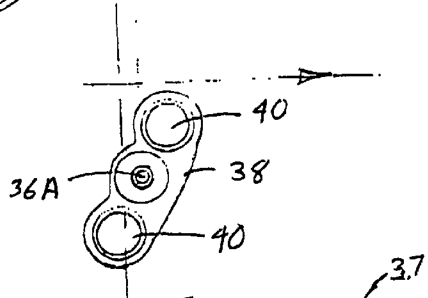
FIG. 5 bottom view of the writing instrument portion of the writing aid of the present invention.
Figure 3:
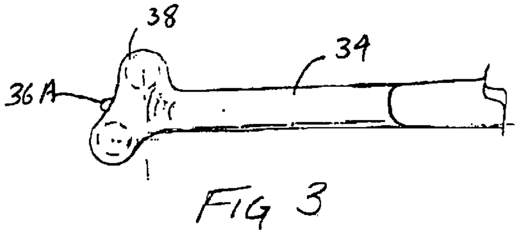
FIG. 3 is a front side view of a lower section of the writing instrument portion of the writing aid of the present invention.
Figure 2:
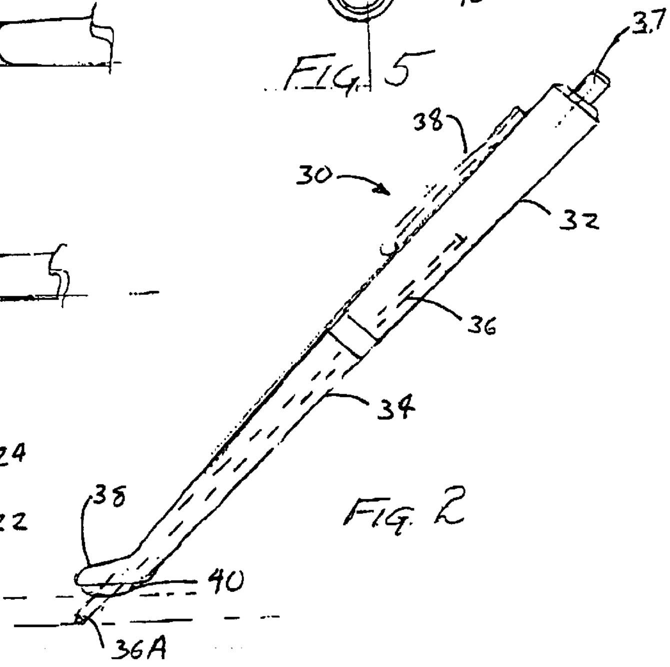
FIG. 2 is a side view of the writing instrument portion of the writing aid of the present invention.
Figure 4:
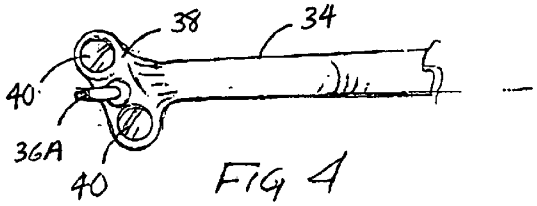
FIG. 4 is a back side view of a lower section of the writing instrument portion of the writing aid of the present invention.
Figure 6:
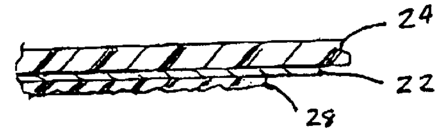
FIG. 6 is a cross sectional view of the writing tablet portion of the writing aid of the present invention.

Referring to the Figures, a writing aid 10 is shown. The writing aid 10 is comprised of a writing platform 20 and a writing instrument 30. The writing platform 20 has a magnetic layer 22. The magnetic layer 22 is generally a sheet of magnetic material. In general a light weight ferrous metal sheet is used as the magnetic layer 22.

A covering 24 is removably coupled on top of the magnetic layer 22. The covering 24 is used for several reasons. First, the covering 24 may be placed on the magnetic layer 22 to lessen the pull of the magnetic layer 22. When in use, the magnetic attraction between the magnetic layer 22 of the writing platform 20 and the writing instrument 30 may be so strong that certain individuals may have a difficult time moving the writing instrument 30 across the writing platform. Thus, the covering 24 may be placed over the magnetic layer 22 to lessen the pull of the magnetic layer 22. The covering 24 is further used to protect the magnetic layer 22. The magnetic layer 22 may become scratched up and/or dirty from use. This may affect the magnetism of the magnetic layer 22. Thus, the covering 24 is used to protect and maintain the magnetic pull of the magnetic layer 22. The covering 24 may further be used to provide a more suitable writing surface. A material such as plastic, nylon, and the like will provide a nicer writing surface than an uncovered metal surface.

An attachment device 26 is coupled to the covering 24. The attachment device 26 is used to secure a piece of paper 27 to the covering 24 so that the paper 27 will not move when an individual is writing on the paper 27. The attachment device 26 may be a clip, a magnet, or other similar devices. In use, one would lift the attachment device 26 so that the paper 27 may be placed underneath the attachment device 26. The attachment device 26 is then lowered thus securing the paper 27 to the covering 24 so that the paper 27 will not move while writing. If a cover is not used, a magnet may be used to secure the paper 27 to the magnetic layer 22.

A non-slip layer 28 is coupled to the bottom of the magnetic layer 22. The non-slip layer may be some type of rubber surface or the like. The non-slip layer 28 is used to hold the writing platform 20 in position on a table so that the writing platform 20 will not move or slid while in use.

The writing instrument 30 is similar to a ball point pen or a mechanical pencil. However, there are a few modifications to a standard ball point pen or a mechanical pencil. Generally speaking, the writing instrument 30 will have an upper body section 32 and a lower body section 34. The upper and lower body sections 32 and 34 may be made from any type of material. Plastic, metal or the like may be used. The listing of the above should not be seen as to limit the scope of the present invention. The upper and lower body sections 32 and 34 are generally hollow so that a ballpoint pen ink refill cartridge 36 or pencil lead may be placed inside the upper and lower body sections 32 and 34. The upper body section 32 will have a push mechanism 37. The push mechanism 37 is used to lower and retract the ballpoint pen ink refill cartridge 36 or the pencil lead. The upper body section 32 may further have a clip 38. The clip 38 is used to secure the writing instrument 30 to a shirt pocket or the like.

The lower body section 34 will have an angled bottom surface 38. The angled bottom surface 38 will be angled so that if the angled bottom surface 38 is in contact with the writing platform 20, the writing instrument will be at an approximately 45° angle. In other words, the angled bottom surface 38 is formed so that when the angled bottom surface 38 is in contact with the writing platform 20, the angle of the writing instrument should be approximately the writing angle that most people would hold an ordinary pen/pencil.

On the bottom of the angled bottom surface 38 is a magnet 40. One or more magnets 40 may be used. The magnet 40 is used to pull the tip 36A of the ballpoint pen ink refill cartridge 36 closer against the writing platform 20 so that a slight drag can be felt while writing. This will help to stabilize a person's whose hand shakes when writing. Different sizes and strength of magnets 40 may be used depending on the amount of resistance desired when moving the writing instrument 30 while writing.

In accordance with one embodiment of the present invention, a pair of magnets 40 are used. The pair of magnets 40 will be slightly offset so that one magnet 40 will be positioned in front of the tip 36A and the second magnet 40 will be sightly behind the tip 36A. The magnet 40 positioned slightly ahead of the tip 36A will have a slightly stronger magnet pull than the magnet 40 positioned sightly behind the tip 36A. This is done since, in general, slightly more pressure will be placed ahead of the tip 36A than behind the tip 36A.

The upper and lower body sections 32 and 34 are rotatably couple together. The upper and lower body sections 32 and 34 will have ribs and threading in order to rotatably coupled the upper and lower body sections 32 and 34 together. By twisting the lower body section 34, one can adjust how much of the tip 36A is exposed. By adjusting how much of the tip 36A is exposed, one can adjust the strength of the magnetic pull between the magnet 40 and the magnetic layer 22 of the writing platform 20. For those who's need more support when writing, the lower body section 34 may be rotated so that very little of the tip 36A is exposed. This will provided the maximum magnetic pull between the magnet 40 and the magnetic layer 22 of the writing platform 20. It should be noted that the covering 24 may also be removed to increase the amount of magnetic pull between the magnet 40 and the magnetic layer 22. For those who need less support, the lower body section 34 may be rotated so that the maximum amount of the tip 36A is exposed. This will provided the least amount of magnetic pull between the magnet 40 and the magnetic layer 22 of the writing platform 20.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A writing aid for helping to steady a hand of an individual to allow the individual to write in a more steady manner comprising:

a writing pad wherein the writing pad has a magnetic layer; and a writing instrument, wherein the writing instrument has at least one magnet coupled to a bottom section of the writing instrument, a magnetic attraction between the magnet and the magnetic layer steadying the hand of the individual using the writing aid, the writing instrument being adjustable so the individual can adjust a length of a writing tip of the writing instrument that is deployed to adjust the magnetic attraction between the magnet at the bottom section of the writing instrument and the magnetic layer, wherein the writing instrument comprises:

a top body section; and a lower body section wherein the top body section and the lower body section are rotatable coupled together;

wherein the top body section and the lower body section both have a channeling for housing a writing cartridge, the length of the writing tip that is deployed being adjustable by rotating the lower body section.

2. A writing aid for helping to steady a hand of an individual in accordance with claim 1 wherein the writing pad further comprises a non slick pad coupled to a bottom surface of the magnetic layer for preventing the writing pad from moving when the writing aid is being used.

3. A writing aid for helping to steady a hand of an individual in accordance with claim 1 wherein the writing pad further comprises a cover coupled to a top surface of the magnetic layer for lessening the magnetic pull of the magnetic layer and for protecting the magnetic layer from being damaged.

4. A writing aid for helping to steady a hand of an individual in accordance with claim 3 further comprising an attachment device coupled to the cover for holding a piece of paper on the writing pad.

5. A writing aid for helping to steady a hand of an individual in accordance with claim 1 wherein the lower body section further comprises an angled bottom surface formed on a bottom section of the lower body section, the magnet being coupled to the angled bottom surface, the angled bottom surface formed so the writing instrument is at an approximately 45° angle when the angled bottom surface is flush with the writing pad.

6. A writing aid for helping to steady a hand of an individual in accordance with claim 1 wherein the top body section has a clip for securing the writing instrument to an object.

7. A writing aid for helping to steady a hand of an individual in accordance with claim 1 wherein the top body section has a push mechanism for deploying and retracting the writing tip of the writing cartridge.

8. A writing aid for helping to steady a hand of an individual to allow the individual to write in a more steady manner comprising:

a writing pad wherein the writing pad comprises:

a magnetic layer;

a non slick pad coupled to a bottom surface of the magnetic layer for preventing the writing pad from moving when the writing aid is being used; and a cover coupled to a top surface of the magnetic layer for lessening the magnetic pull of the magnetic layer and for protecting the magnetic layer from being damaged; and a writing instrument, wherein the writing instrument has at least one magnet coupled to a bottom section of the writing instrument, a magnetic attraction between the magnet and the magnetic layer steadying the hand of the individual using the writing aid, the writing instrument being adjustable so the individual can adjust a length of a writing tip of the writing instrument that is deployed to adjust the magnetic attraction between the magnet at the bottom section of the writing instrument and the magnetic layer, wherein the writing instrument comprises:

a top body section;

a lower body section wherein the top body section and the lower body section are rotatably coupled together; and an angled bottom surface formed on a bottom section of the lower body section, the magnet being coupled to the angled bottom surface, the angled bottom surface formed so the writing instrument is at approximately 45° angle when the angled bottom surface is flush with the writing pad;

wherein the top body section and the lower body section both have channeling for housing a writing cartridge, the length of the writing tip that is deployed being adjustable by rotating the lower body section.

9. A writing aid for helping to steady a hand of an individual in accordance with claim 8 further comprising an attachment device coupled to the cover for holding a piece of paper on the writing pad.

10. A writing aid for helping to steady a hand of an individual in accordance with claim 8 wherein the top body section has a clip for securing the writing instrument to an object.

11. A writing aid for helping to steady a hand of an individual in accordance with claim 8 wherein the top body section has a push mechanism for deploying and retracting the writing tip of the writing cartridge.

* * * * *